Jan. 4, 1966      R. N. OGREN      3,227,817
DUAL ACTION WINDSHIELD WIPER CONTROL
Filed Nov. 29, 1963
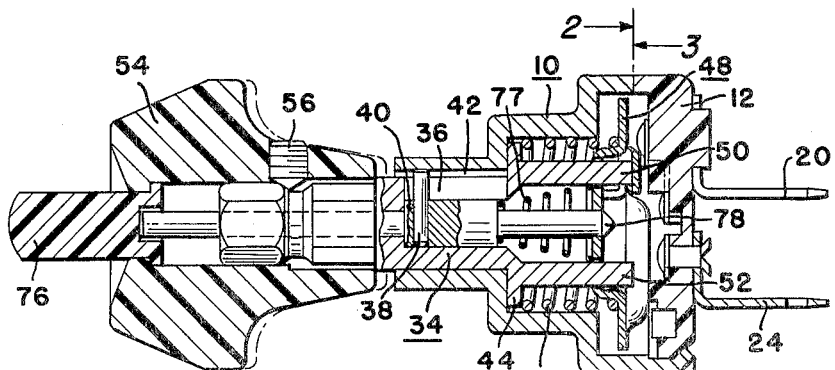
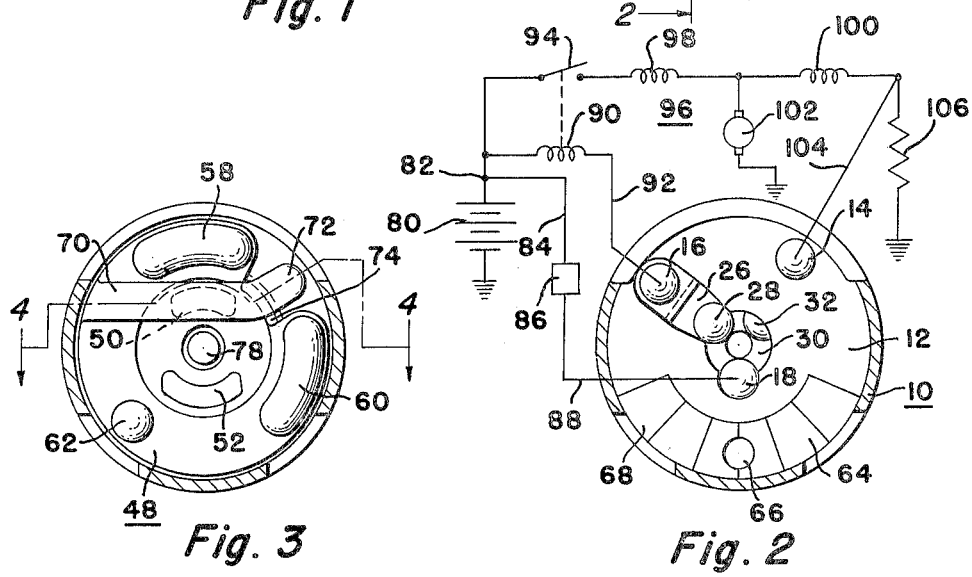
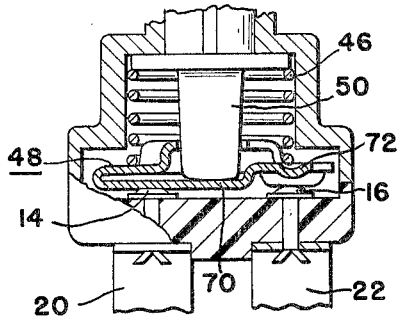
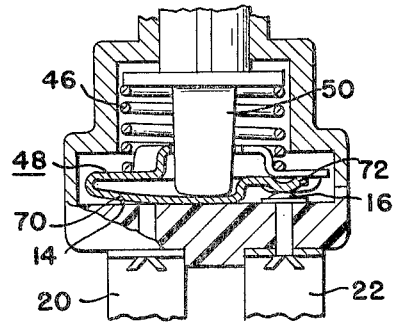
INVENTOR.
Ronald N. Ogren
BY
W. E. Finken
His Attorney

United States Patent Office 3,227,817
Patented Jan. 4, 1966

3,227,817
DUAL ACTION WINDSHIELD WIPER CONTROL
Ronald N. Ogren, Rochester, N.Y., assignor to General Motors Corporation, Detroit, Mich., a corporation of Delaware
Filed Nov. 29, 1963, Ser. No. 326,754
5 Claims. (Cl. 200—4)

This invention pertains to the art of windshield cleaning, and particularly to a dual action control for a wiper unit.

Heretofore, it has been the practice to utilize a joint control for the wiper unit and the washer unit of a windshield cleaning system wherein the wiper unit can be activated for continuous operation independently of the washer unit by a first control member, and wherein the washer unit and the wiper unit can be conjointly activated by a second manual control member. Joint controls of the aforesaid type are disclosed in Patent Numbers 2,905,962 and 2,948,792 wherein the wiper control comprises a rotatable knob and the washer control comprises a reciprocable button mounted coaxially of the knob.

Under some driving conditions, however, continuous operation of the wiper unit does not provide adequate vision. For example, during drizzling weather conditions there is insufficient moisture on the windshield to require continuous wiper unit operation, and continuous wiper operation only serves to smear the windshield and thus impair visibility therethrough. Thus, with conventional windshield cleaning systems the vehicle operator must periodically operate the wiper control to activate and inactivate the wiper unit. The present invention contemplates another mode of wiper unit operation, namely that of a single complete stroke back and forth to remove the accumulated moisture on the windshield without smearing. This automatic one stroke wiper unit movement is initiated by a single manipulative action by the vehicle operator thus eliminating the distraction that necessarily results with the two manipulative actions required in conventional systems. Accordingly, among my objects are the provision of an improved windshield washer control system including dual control means for the wiper unit to select either continuous wiper unit operation or one stroke wiper unit operation; the further provision of a dual action control for a wiper unit; and the still further provision of a wiper unit control capable of two independent movements to obtain either continuous wiper unit operation or one stroke wiper unit operation.

The aforementioned and other objects are accomplished in the present invention by embodying a rotatable and axially movable wiper control member in the dual action control. Specifically, the control comprises a rotatable and axially movable driver journalled in a housing for actuating switch means to activate a wiper unit and a coaxial reciprocable rod for actuating a washer unit switch. In the present invention the driver is spring biased outwardly such that momentary depression and release of the driver will momentarily close the one switch to initiate a one stroke movement of the wiper unit, and rotation of the driver will close a second switch to initiate continuous wiper unit operation.

Further objects and advantages of the present invention will be apparent from the following description, reference being had to the accompanying drawing, wherein a preferred embodiment of the present invention is clearly shown.

In the drawing:

FIGURE 1 is a longitudinal sectional view of a control constructed according to the present invention.

FIGURE 2 is a sectional view taken along line 2—2 of FIGURE 1 illustrating the switch and its connection with an electric circuit.

FIGURE 3 is a sectional view taken along line 3—3 of FIGURE 1.

FIGURE 4 is a fragmentary view, partly in section and partly in elevation, taken along line 4—4 of FIGURE 3 of the control in the "off" position.

FIGURE 5 is a view similar to FIGURE 4 illustrating the control in the momentary "on" position.

Referring to FIGURE 1, the improved joint control of the present invention is particularly designed for use with a cleaning system of the type disclosed in Patent #2,985,024 including an electric motor driven wiper unit and an electrically controlled washer unit having an interruptible driving connection with the wiper unit. However, it is to be understood that the dual action control can be used with other known wiper systems. Accordingly, the control includes a metallic switch housing 10 having an insulator member 12 attached thereto and closing one end thereof. The insulator member 12 carries fixed contacts 14, 16 and 18. The contacts 14, 16 and 18 are constituted by rivets which support spade terminals 20, 22 and 24, respectively. Contact 16, in addition, supports a connector member 26 which carries a fixed electrical contact 28. Contacts 18 and 28 are located within an annular groove, or recess, 30 of the insulator member 12. A boss, or projection, 32 is likewise located within the annular groove 30 of the insulator member 12, the contacts 18, 28 and the boss 32 being angularly spaced in triangular fashion. In general, the switch construction of the instant control is similar to that disclosed in aforementioned Patent #2,948,792.

The switch housing 10 encloses a metallic driver 34 in the form of a hollow shaft of stepped diameter. The driver 34 has an axially extending slot 36 which received a cross pin 38 attached to a centrally mounted reciprocable rod 40. The cross pin 38 is engageable with an integral helical surface 42 formed in the housing 10 when the rod 40 is moved axially inward, the purpose of which will be pointed out hereinafter. The driver 34 has a radially extending flange 44 which engages a wall of the housing 10, this flange being biased against the wall of the housing by a coil spring 46 reacting between the flange 44 and an annular contact plate 48 rotatable with the driver 34. The connection between the contact plate 48 and the driver is effected by a pair of arcuate legs 50 and 52 which extend through corresponding slots in the contact plate 48. An actuating knob 54 is secured to a hexagonal portion of the driver shaft by a set screw 56. It is to be noted that the inner end of the knob 54 is spaced from the outer end of the housing 10 to facilitate limited axial movement of the knob and the driver relative to the housing as will be pointed out more particularly hereinafter.

The contact plate 48, as seen particularly in FIGURE 3 and which may be formed of brass, has a pair of circumferentially spaced projecting contacts 58 and 60 formed integrally therewith. The contact plate 48 also has a detent projection 62 that coacts with the detent depressions 64, 66 and 68 formed in the insulator plate 12. In addition, the contact plate 48 is formed with a spring leg 70 bent over the face of the contact plate and having contact portion 72 disposed between contact projections 58 and 60. In order to provide space for the contact portion 72 of the spring arm 70, the annular contact plate 48 has a cutout peripheral portion 74 between the contact projections 58 and 60 as clearly shown in FIGURE 3.

The reciprocable rod 40 extends into the hollow knob 54 and has a push button, or plunger, 76 located coaxially of the knob 54. The rod 40 is formed of metal and has a contact portion 78 at the inner end thereof adapted to engage contacts 18 and 28 and the boss 32 when the rod, or plunger, 40 is fully depressed. The rod 40 is normally biased outwardly by coil spring 77. The boss and the two contacts function as a three point positioning means for the end of the plunger, and the boss 32 assures that the end 78 of the plunger will engage contacts 18 and 28 when it is fully depressed. Furthermore, since the cross pin 38 attached to the rod 40 coacts with the helical cam surface 42, rotation will be imparted to the driver 34 as well as the contact plate 48 when the push button 76 is depressed.

Referring to FIGURE 2, the circuit for the wiper unit and the washer unit is shown comprising a battery 80 having one terminal grounded and the other terminal connected to a wire 82. The wire 82 is connected by wire 84 to a washer relay 86 which is connected by a wire 88 to contact 18. Wire 82 is also connected to a relay coil 90 which is connected by wire 92 to the contact 16. Relay coil 90, when energized, closes a parking switch 94 for completing a circuit to the electric wiper motor 96 which includes a series field winding 98, a shunt field winding 100 and an armature 102. The parking switch 94 is automatically opened by the wiper unit at the end of the wiper stroke when the coil 90 is deenergized. The shunt field winding 100 is connected by wire 104 to switch contact 14 and is also connected to a speed controlling resistor 106.

In the "off" position of the joint control, the detent 62 on the contact plate engages depression 64 of the insulator body 12, and in this position the contact 60 does not engage any of the fixed contacts on the insulator body, while contact 58 engages fixed contact 14. When the knob 54 is rotated in the clockwise direction and the detent projection 62 engages the depression 66, contact 60 will engage contact 16 and contact 58 will still be in engagement with contact 14. Accordingly, the energizing circuit for the relay coil 90 will be completed and the resistor 106 will be shorted out by the switch contact 58. It is to be understood, of course, that the contact plate 48 is grounded through the switch housing 10. Energization of the relay 90 will close the switch 94 to energize the wiper motor 96 for low speed rotation. Further clockwise rotation of the knob 54 until the detent projection 62 engages detent recess 68 will result in disengagement of contact 58 from contact 14 while contact 60 remains in engagement with contact 16. Accordingly, the relay coil 90 remains energized and the resistor 106 is connected in series with the shunt field winding 100 so as to effect high speed rotation of the wiper motor 96.

With the control knob 54 in the "off" position as shown, if the push button 76 is momentarily depressed to effect inward axial movement of the rod, or plunger, 40 and since the rod 40 is electrically grounded, the end 78 will engage contacts 18 and 28. Engagement of rod 78 with contact 18 will energize the washer solenoid 86, and engagement of the end 78 with the contact 28 will energize the relay coil 90. Accordingly, both the washer and the wiper unit will be energized for conjoint operation. At the same time, the cross pin 38 coacting with the helical groove 42 will rotate the driver 34 to the low speed position, that is, to the position where detent projection 62 engages detent recess 66 whereat contact 60 engages contact 16 and contact 58 remains in engagement with contact 14. Accordingly, the wiper unit motor will operate at low speed. Upon release of the push button 76 the washer solenoid 86 will be deenergized and the wiper unit motor will continue to be energized until the control knob 54 is normally rotated to the "off" position.

To effect an automatic one stroke wiping cycle, the control knob 54 is pushed axially inward to the phantom line position shown in FIGURE 1 to compress the spring 46. In so doing the arcuate leg 50 of the driver 34 will deflect the spring arm 70 so as to move its contact 72 into engagement with contact 16 thereby completely energizing the circuit for the relay coil 90. This position of the spring arm 70 is shown in FIGURE 5. Since the knob 54 is in the "off" position the resistor 106 is shorted out by engaged contacts 14 and 58. Accordingly, momentary actuation of the spring arm 70 to engage contacts 72 and 16 and release thereof will cause the wiper unit to operate throughout one complete stroke at low speed. This mode of operation is obtained since the parking switch 94 is only closed by the relay coil 90 and is automatically opened mechanically by the wiper unit in accordance with the teachings of the aforementioned Patent #2,985,024.

While the embodiment of the invention as herein disclosed constitutes a preferred form, it is to be understood that other forms might be adopted.

What is claimed is as follows:

1. A dual action control for a wiper unit including, a housing, a member rotatable and axially movable in said housing, means actuated upon rotation of said member to activate the wiper unit for continuous operation, and means operable upon momentary axial movement and release of said member to activate the wiper unit for a single stroke movement.

2. A dual action control for a wiper unit including, a housing, a control member rotatably and axially movable relative to said said housing, resilient means biasing said control member axially outward relative to said housing, means actuated upon rotation of said control member to activate the wiper unit for continuous operation, and means operable upon momentary depression and release of said control member to activate the wiper unit for a single stroke movement.

3. A dual action control for a wiper unit driven by an electric motor including, a switch housing, a plurality of fixed contacts in said housing, a movable contact plate in said housing adapted to engage said fixed contacts, and a member operatively connected with said contact plate and supported for rotation and axial movement relative to said housing whereby rotation of said member will effect rotation of said contact plate into engagement with said fixed contacts to complete an energizing circuit for the wiper unit to effect continuous operation thereof and momentary axial movement and release of said member effects axial movement of a portion of said contact plate into engagement with one of said fixed contacts to complete the energizing circuit for the wiper unit for a single stroke movement thereof.

4. A dual action control for a wiper unit driven by an electric motor including, a switch housing, a plurality of fixed contacts supported in said housing, a drive member rotatably and axially movable in said housing, a contact plate supported on said drive member and adapted to engage said fixed contacts, and resilient means biasing said drive member axially outward relative to said housing whereby rotation of said drive member effects rotation of said contact plate into engagement with said fixed contacts to complete an energizing circuit for the wiper unit for continuous operation thereof and momentary depression and release of said drive member imparts axial movement of a portion of said contact plate into engagement with one of said fixed contacts to complete the energizing circuit for the wiper unit for a single stroke movement thereof.

5. A dual action control switch for an electric motor driven wiper unit including, a housing, a plurality of fixed contacts disposed in said housing, a drive member rotatable and axially movable in said housing, an annular contact plate supported by said drive member for rotation therewith and adapted to engage said fixed contacts, said drive member extending through said contact plate, said contact plate having a spring arm contact engaging the end of said drive member so as to move axially therewith, and resilient means biasing said drive member axially outward relative to said housing whereby rotation of said drive member will rotate said contact plate to effect engagement between the contact plate and said fixed contacts and inward axial movement of said drive member will deflect said spring arm contact into engagement with one of said fixed contacts.

References Cited by the Examiner

UNITED STATES PATENTS 2,948,792    8/1960    Elliott et al. _____ 200—156
3,110,056    11/1963    Oishei et al. _____ 15—250.12

KATHLEEN H. CLAFFY, *Primary Examiner.*

MORRIS GINSBURG, *Examiner.*